US011492910B2

(12) United States Patent
Pankaj et al.

(10) Patent No.: US 11,492,910 B2
(45) Date of Patent: Nov. 8, 2022

(54) DAMPER SEALS FOR ROTATING DRUMS IN TURBOMACHINES

(71) Applicant: General Electric Company, Schenectady, NY (US)

(72) Inventors: Peeyush Pankaj, Bangalore (IN); Narayanan Payyoor, Bangalore (IN); Richard Schmidt, Loveland, OH (US); Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 16/697,406

(22) Filed: Nov. 27, 2019

(65) Prior Publication Data

US 2021/0156256 A1   May 27, 2021

(51) Int. Cl.
*F01D 5/10* (2006.01)
*F01D 11/08* (2006.01)

(52) U.S. Cl.
CPC ............... *F01D 5/10* (2013.01); *F01D 11/08* (2013.01); *F05D 2220/32* (2013.01); *F05D 2240/24* (2013.01)

(58) Field of Classification Search
CPC ........ F01D 5/10; F01D 11/08; F05D 2220/32; F05D 2240/24; F16J 15/447; F16J 15/4472; F16J 15/4474
See application file for complete search history.

(56) References Cited

U.S. PATENT DOCUMENTS

| 2,935,297 | A | | 5/1960 | Stalker | |
| 4,050,845 | A | | 9/1977 | Gemein et al. | |
| 5,344,239 | A | * | 9/1994 | Stallone | F16C 27/045 384/99 |
| 5,707,064 | A | * | 1/1998 | Vance | F16J 15/44 277/916 |
| 5,794,942 | A | * | 8/1998 | Vance | F01D 25/04 277/411 |
| 6,231,301 | B1 | | 5/2001 | Barnett et al. | |
| 6,375,416 | B1 | | 4/2002 | Farrell et al. | |
| 6,390,770 | B1 | | 5/2002 | Takeshita | |
| 9,057,383 | B2 | | 6/2015 | Vannini et al. | |
| 2006/0267289 | A1 | * | 11/2006 | Li | F16J 15/445 277/347 |
| 2007/0069477 | A1 | * | 3/2007 | Li | F04D 29/102 277/415 |
| 2013/0140774 | A1 | * | 6/2013 | Chochua | F16J 15/4472 277/303 |
| 2017/0241427 | A1 | * | 8/2017 | Nakaniwa | F04D 29/284 |
| 2018/0087384 | A1 | | 3/2018 | Pankratov et al. | |

* cited by examiner

*Primary Examiner* — Gilbert Y Lee
(74) *Attorney, Agent, or Firm* — Dority & Manning, P.A.

(57) ABSTRACT

A damper seal for a turbomachine includes an annular body having an inner circumferential surface and an outer circumferential surface separated by a thickness. As such, the inner circumferential surface may define a plurality of cavities arranged into a plurality of circumferential rows and at least one partition positioned between at least two of the plurality of cavities. In addition, the inner circumferential surface may further define at least one plenum arranged between two of the plurality of circumferential rows.

17 Claims, 7 Drawing Sheets

DAMPER SEALS FOR ROTATING DRUMS IN TURBOMACHINES

FIELD

The present disclosure relates generally to turbomachines, and more particularly, to damper seals for rotating drums in turbomachines, such as gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Gas turbine engines generally include a plurality of rotating rotor blades in at least one of a compressor of the compressor section or a turbine of the turbine section. Moreover, at least certain gas turbine engines also include a plurality of counter-rotating rotor blades in at least one of the compressor of the compressor section or the turbine of the turbine section. Common rotating blades are assembled and retained internally by a disk or inner rotor. The disk is typically located internally respect to the blade row. Counter-rotating blades are similarly attached to a rotating part, and for interdigitated blade configurations, to an outer rotating drum.

In certain configurations, such an overhung outer rotating drum, the drum can experience several fundamental modes, e.g. cantilevered drum mode, diametral mode, and out-of-phase crunch mode with respect to the inner rotor during operation that can cause excessive vibrations. Such vibrations can be harmful to the rotating or stationary parts.

Accordingly, there is a need to dampen such vibrations during operation of the gas turbine engine to prevent damage from occurring to the rotating parts as well as to improve efficiency. Thus, the present disclosure is directed to a damper seal configured to restrict the airflow in certain directions to increase damping, thereby reducing vibrations of the rotating drums.

BRIEF DESCRIPTION

Aspects and advantages of the invention will be set forth in part in the following description, or may be obvious from the description, or may be learned through practice of the invention.

In one aspect, the present disclosure is directed to a turbomachine. The turbomachine includes a rotatable annular drum rotor and a first plurality of blades connected to the rotatable annular drum rotor. Each of the first plurality of blades includes a blade root portion and a blade tip portion. The blade root portions are secured to the rotatable annular drum rotor. Moreover, the turbomachine includes at least one annular seal positioned between one of the blade tip portions and the rotatable annular drum rotor. In addition, the annular seal(s) includes an inner circumferential surface and an outer circumferential surface separated by a thickness. As such, the inner circumferential surface defines at least one cavity configured to provide damping to the turbomachine, e.g. in the radial direction (rotor-to-rotor or rotor-to-stator).

In another aspect, the present disclosure is directed to a damper seal for a turbomachine. The damper seal may include an annular body having an inner circumferential surface and an outer circumferential surface separated by a thickness. As such, the inner circumferential surface may define a plurality of cavities arranged into a plurality of circumferential rows and at least one partition positioned between at least two of the plurality of cavities. In addition, the inner circumferential surface may further define at least one plenum arranged between two of the plurality of circumferential rows.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
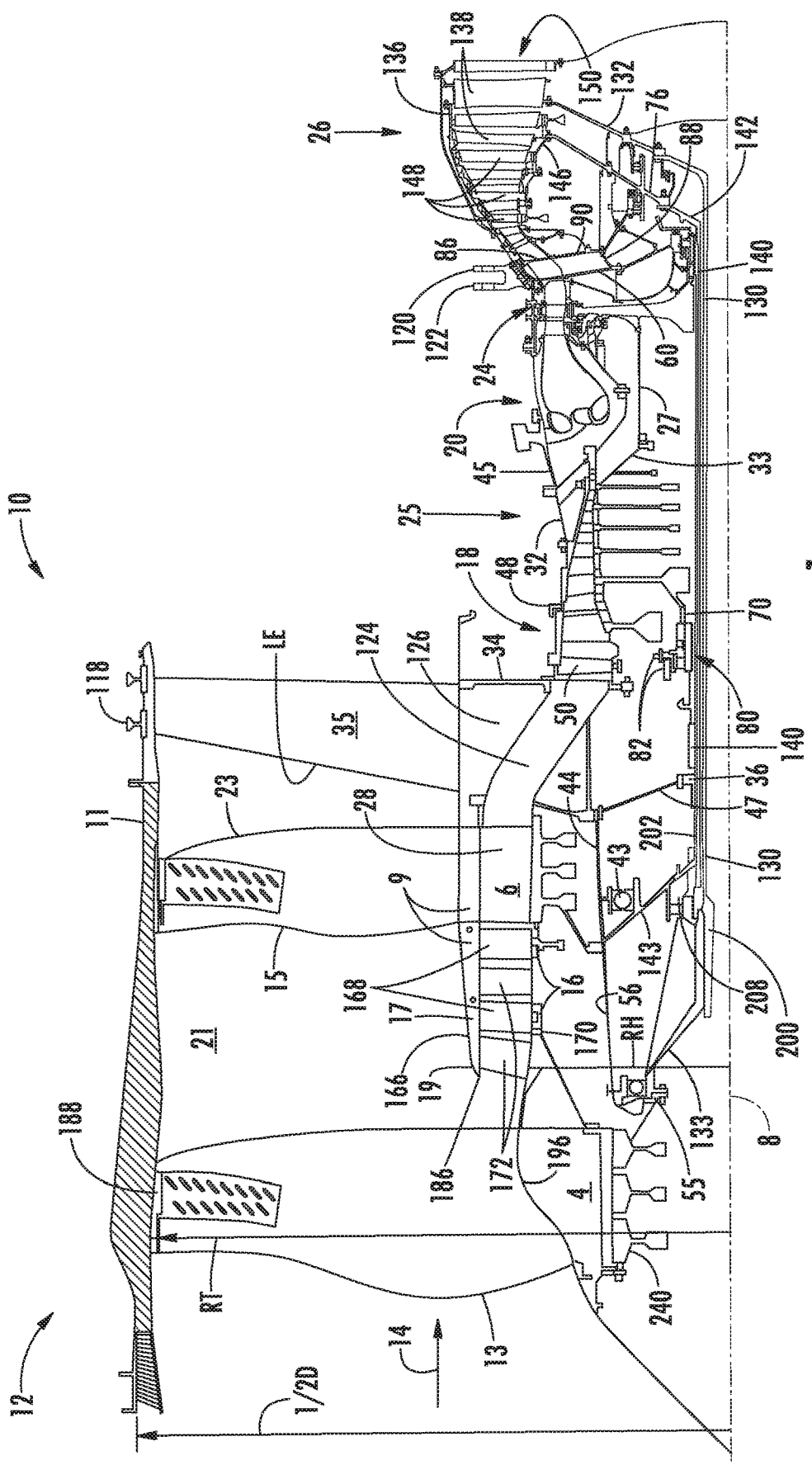
FIG. 1 illustrates a longitudinal sectional view of one embodiment of an aircraft turbofan gas turbine engine with a low pressure turbine supported by an inter-turbine frame axially located between the low pressure turbine and a high pressure turbine.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component or feature from another and are not intended to signify location, importance, or magnitude of the individual components or features.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to direct coupling, fixing, or attaching, as well as indirect coupling, fixing, or attaching through one or more intermediate components or features, unless otherwise specified herein. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Generally, the present disclosure is directed to partitioned pocket damper seals and fully-partitioned pocketed damper seals for turbomachines, such as gas turbine engines, that are in contact with certain airfoils of the machine. Such seals provide significant damping benefit over conventional labyrinth seals. In addition, the damper seals of the present disclosure can be used in applications requiring a short seal length or smaller length-to-diameter ratio.

Referring now to the drawings, FIG. 1 illustrates a schematic view of one embodiment of a turbomachine, such as a turbofan gas turbine engine 10 according to the present disclosure. As shown, the gas turbine engine 10 is circumscribed about an engine centerline 8 and includes a fan section 12 which receives inlet airflow of ambient air 14. The fan section 12 has counter rotating first and second fans 4 and 6 including first and second fan blade rows 13 and 15 and counter rotating first and second boosters 16 and 17, respectively. The counter rotating first and second boosters 16 and 17 are axially located between the counter rotating first and second fan blade rows 13 and 15, an arrangement which provides reduced noise emanating from the fan section 12. Following the fan section 12 is a high pressure compressor (HPC) 18, a combustor 20 which mixes fuel with the air 14 pressurized by the HPC 18 for generating combustion gases which flow downstream through a high pressure turbine (HPT) 24, and a low pressure turbine (LPT) 26 from which the combustion gases are discharged from the engine 10. The engine 10 is designed such that the last stage of the second booster 17 and, in the exemplary embodiment, the second fan blade row 15 are counter rotatable with respect to the high pressure compressor 18. This reduces the sensitivity of the engine 10 to airflow inlet distortion of the fan section 12. It also reduces mutual sensitivity to rotating stall cells in the other rotors.

A high pressure shaft 27 joins the HPT 24 to the HPC 18 to substantially form a first or high pressure rotor 33. The high pressure compressor 18, the combustor 20, and the high pressure turbine 24 collectively are referred to as a core engine 25 which includes, for the purposes of this patent, the high pressure shaft 27. The core engine 25 is modular such that as a single unit it can be independently replaced separate from the other parts of the gas turbine.

A bypass duct 21 radially, bounded by a fan casing 11 and a rotatable annular radially inner bypass duct wall 9, surrounds the counter rotating first and second boosters 16 and 17 and an inlet duct 19 to the high pressure compressor 18 of the core engine 25. The bypass duct 21 is radially bounded by a fan casing 11 and an annular radially inner bypass duct wall 9. The radially inner bypass duct wall 9 is fixedly mounted to the second fan blade row 15. Further, as shown, the second booster 17 extends radially inward with respect to the bypass duct wall 9. A radially outer portion 23 of the second fan blade row is radially disposed within the bypass duct 21.

Figure 2:
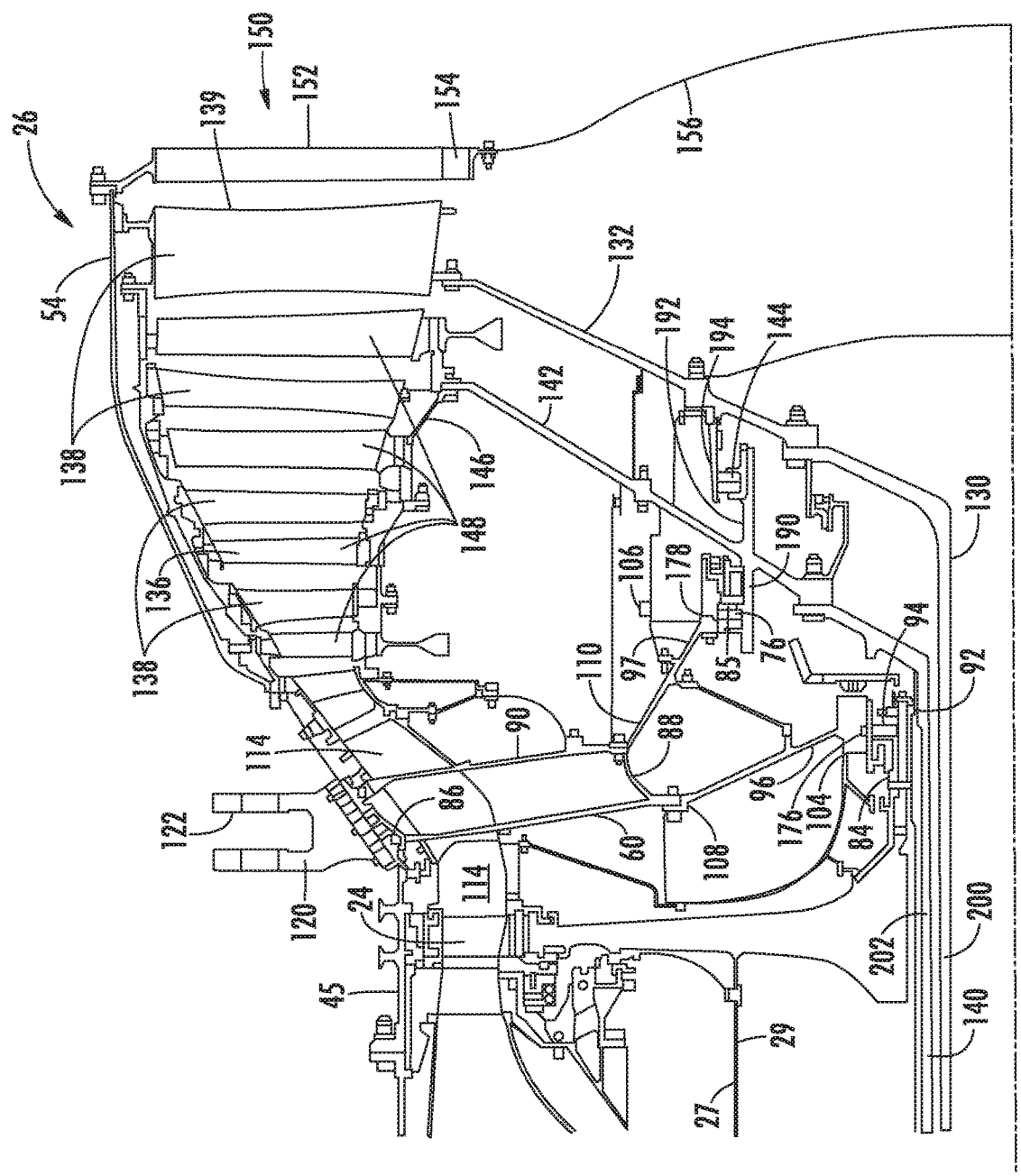
FIG. 2 illustrates an enlarged view illustration of the inter-turbine frame and low pressure turbine rotors of the engine in FIG. 1.

Referring to FIGS. 1 and 2, the low pressure turbine 26 includes an annular outer drum rotor 136 rotatably mounted to a low pressure inner shaft 130 by an aft low pressure inner conical shaft extension 132. The outer drum rotor 136 includes a plurality of low pressure turbine blade rows 138 extending radially inwardly therefrom and axially spaced from each other. The drum rotor 136 is cantilevered off of a final stage of the low pressure turbine blade rows 138 which is bolted to the aft low pressure inner conical shaft extension 132. The low pressure turbine 26 also includes an annular low pressure inner drum rotor 146 rotatably mounted to a low pressure outer shaft 140 by an aft low pressure outer conical shaft extension 142. The inner drum rotor 146 includes a plurality of second low pressure turbine blade rows 148 extending radially outwardly therefrom and axially spaced from each other. The first low pressure turbine blade rows 138 are interdigitated with the second low pressure turbine blade rows 148.

The low pressure outer shaft 140 drivingly connects the inner drum rotor 146 to the second fan blade row 15 and the second booster 17. The second fan blade row 15 is connected to the low pressure outer shaft 140 by a forward conical outer shaft extension 143. The low pressure outer shaft 140, the inner drum rotor 146, the second fan blade row 15, and the second booster 17 are major components of a low pressure outer rotor 202. The low pressure inner shaft 130 drivingly connects the outer drum rotor 136 to the first fan blade row 13 and the first booster 16. The first fan blade row 13 is connected to the low pressure inner shaft 130 by a forward conical inner shaft extension 133. The low pressure inner shaft 130, the outer drum rotor 136, the first fan blade row 13, and the first booster 16 are major components of a low pressure inner rotor 200.

The first booster 16 includes an annular first booster rotor section 166 from which axially spaced apart first booster blade rows 168 extend radially inwardly. The annular first booster rotor section 166 is illustrated as being integrally bladed in a manner similar to an integrally bladed disk, commonly referred to as a Blisk, or an integrally bladed rotor which has been used in conventional rotors because they are lightweight and allow no blade attachment leakage. The operating low speeds of the boosters and the low weight integrally bladed disk design of the first booster rotor section 166 helps minimize stresses and deflections of the first booster rotor section 166.

The second booster 17 includes an annular second booster rotor section 170 from which axially spaced apart second booster blade rows 172 extend radially outwardly. A radially inner portion 28 of the second fan blade row 15 is radially disposed within the inlet duct 19 and rotates with the second booster 17 and therefore is considered part of the second booster 17 and a second booster blade row 172. The first and second booster blade rows 168 and 172 are interdigitated and are counter rotating. The first and second fan blade rows 13 and 15 are fixedly attached to the first and second booster rotor sections 166 and 170, respectively. The low pressure inner and outer shafts 130 and 140, respectively, are at least, in part, rotatably disposed co-axially with and radially inwardly of the high pressure rotor 33.

The gas turbine engine 10 also has frame structure 32 including a forward or fan frame 34 connected by an engine casing 45 to a mid-engine or inter-turbine frame 60. The second fan blade row is axially located close to struts 35 of the fan frame 34 and so the leading edges of struts 35 are swept or leaned axially aftwardly to reduce noise. The engine 10 is mounted within or to an aircraft such as by a pylon (not illustrated) which extends downwardly from an aircraft wing. The inter-turbine frame 60 includes a first structural ring 86, which may be a casing, disposed co-axially about the centerline 8. The inter-turbine frame 60 further includes a second structural ring 88 disposed co-axially with and radially spaced inwardly of the first structural ring 86 about the centerline 8. The second structural ring 88 may also be referred to as a hub. A plurality of circumferentially spaced apart struts 90 extend radially between the first and second rings 86 and 88 and are fixedly joined thereto. The struts 90 are hollow in the exemplary embodiment of the invention illustrated herein but, in other embodiments, the struts may not be hollow. Because the inter-turbine frame 60 is axially located between the HPT 24 and the LPT 26 of the high pressure rotor 33 and the low pressure inner and outer rotors 200 and 202, it is referred to as an inter-turbine frame also sometimes referred to as a mid-engine frame.

The engine is mounted to the aircraft at a forwardly located fan frame forward mount 118 on the fan frame 34 and at an aftwardly located turbine frame aft mount 120 on the inter-turbine frame 60. The engine 10 may be mounted below an aircraft wing by a pylon at the forward mount 118 and the aft mount 120 spaced axially downstream from the forward mount 118. The aft mount 120 is used to fixedly join the inter-turbine frame 60 to a platform which is fixedly joined to the pylon. In one embodiment, the aft mount 120 may include a U-shaped clevis 122. Conventional mounts often use a set of circumferentially spaced apart U-shaped devises 122 (only one of the U-shaped clevises is shown in the cross-sectional illustrations in the figures) on the inter-turbine frame 60. The U-shaped devises 122 are designed to be connected by a set of pins to a set of links. The links are connected to a platform on the bottom of the pylon. The U-shaped devises 122 are one type of frame connecting means for connecting the engine to an aircraft. Other types of mounting means besides devises are known in the aircraft industry and can be utilized to mount the frame of the present invention and the engine to the aircraft.

Figure 3:
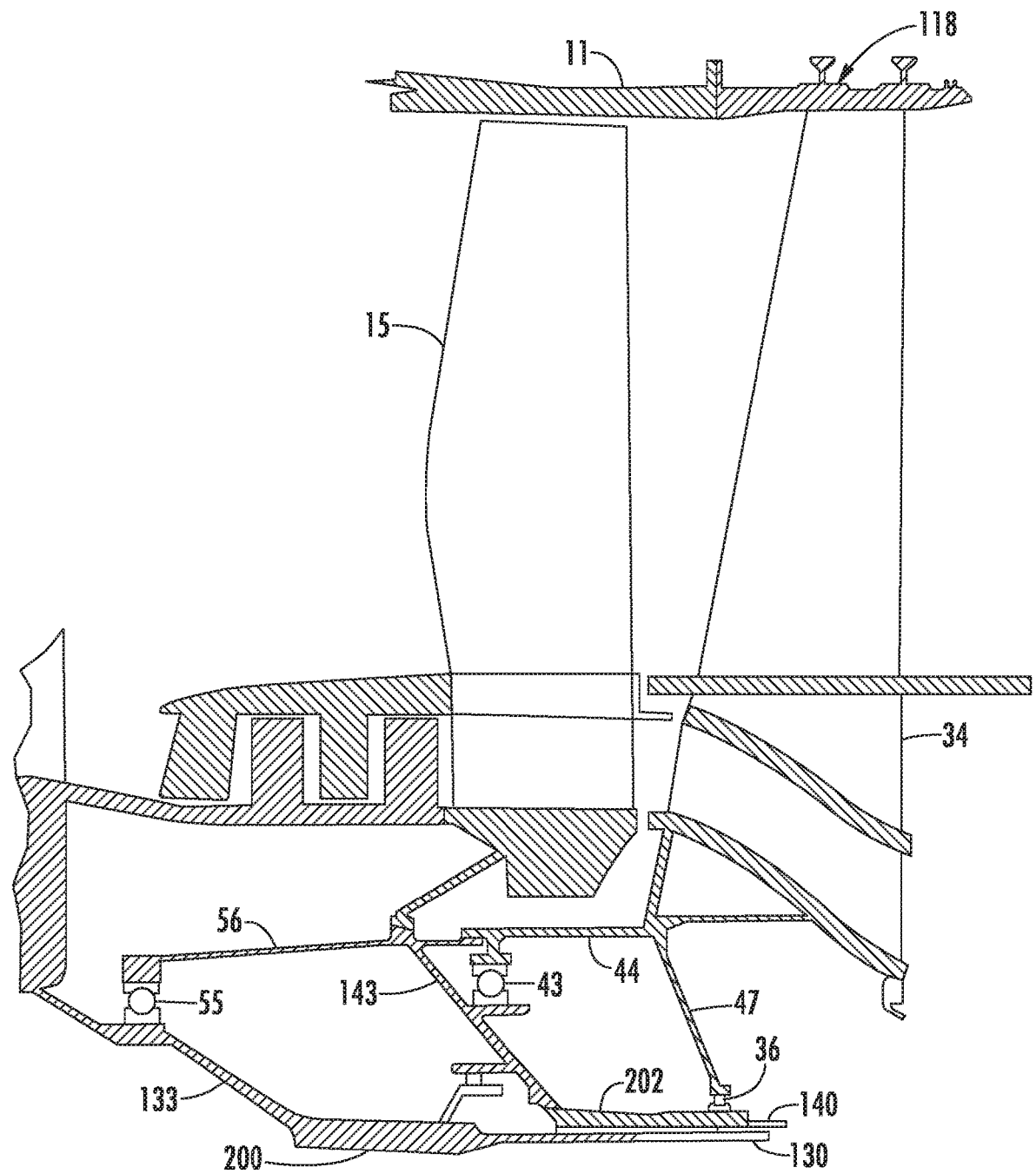
FIG. 3 illustrates an enlarged view illustration of a fan frame and forward bearings and sump of the engine in FIG. 1.

Referring more particularly to FIG. 3, the low pressure outer rotor 202, by way of the forward conical outer shaft extension 143, is rotatably supported axially and radially from the fan frame 34 by an aft thrust bearing 43 mounted in a first bearing support structure 44 and a second bearing 36, a roller bearing, mounted in a second bearing support structure 47. The low pressure inner rotor 200, by way of the forward conical inner shaft extension 133, is rotatably supported axially and radially from the fan frame 34 by a forward differential thrust bearing 55 which is mounted between a forwardly extending extension 56 of the forward conical outer shaft extension 143 and the forward conical inner shaft extension 133. The low pressure inner rotor 200 is further rotatably supported radially from the fan frame 34 by a forward differential bearing 208, a roller bearing, between the low pressure inner shaft 130 and the low pressure outer shaft 140. The first and second bearing support structures 44 and 47 may be fixedly attached to the fan frame 34.

Referring more particularly to FIGS. 2 and 3, the low pressure outer rotor 202, by way of the aft low pressure outer conical shaft extension 142 connected to the low pressure outer shaft 140, is rotatably supported radially by a third bearing 76 within the inter-turbine frame 60. The third bearing 76 is disposed between an aft bearing support structure 97 attached to an aft portion 110 of the inter-turbine frame 60 and a forward inner extension 190 of the aft low pressure outer conical shaft extension 142. The low pressure outer rotor 202 is most aftwardly rotatably supported by the third bearing 76 which is thus referred to as an aftwardmost low pressure rotor support bearing. The inter-turbine frame 60 of the present invention is axially located between the HPT 24 and the LPT 26 and thus substantially supports the entire low pressure turbine 26.

The low pressure inner rotor 200, by way of the aft low pressure inner conical shaft extension 132 connected to the low pressure inner shaft 130, is rotatably supported radially by the aft low pressure outer conical shaft extension 142 of the low pressure outer rotor 202. A differential bearing 144 (also referred to as an inter-shaft bearing) is disposed between an aft inner extension 192 of the aft low pressure outer conical shaft extension 142 and an outer extension 194 of the aft low pressure inner conical shaft extension 132. This allows the low pressure inner and outer rotors 200 and 202 to counter rotate.

Referring back to FIG. 1, a forward high pressure end 70 of the high pressure compressor 18 of the high pressure rotor 33 is radially rotatably supported by a bearing assembly 80 mounted in a bearing assembly support structure 82 attached to the fan frame 34. Referring more particularly to FIG. 2, an aft end 92 of the high pressure rotor 33 is aftwardly radially rotatably supported by a fifth bearing 94 mounted in a forward bearing support structure 96 attached to a forward portion 108 of the inter-turbine frame 60. The forward and aft bearing support structures 96 and 97 which are fixedly joined or attached to the forward and aft portions 108 and 110, respectively, of the inter-turbine frame 60 and thus are spaced axially apart. The forward and aft portions 108 and 110, respectively, of the inter-turbine frame 60 are separated by the second structural ring 88.

Forward and aft sump members 104 and 106 are joined to the inter-turbine frame 60 and carried by forward and aft bearing support structures 96 and 97. The forward and aft sump members 104 and 106 support the fifth bearing 94 and the third bearing 76 in forward and aft cylindrical central bores 84 and 85, respectively, of the sump members. The fifth bearing 94 and the third bearing 76 have forward and aft fixed outer races 176 and 178 that are fixedly connected to the forward and aft bearing support structures 96 and 97, respectively.

Located aft of the LPT 26 is an outlet guide vane assembly 150 which supports a stationary row of outlet guide vanes 152 that extend radially inwardly between a low pressure turbine casing 54 and an annular box structure 154. The outlet guide vane assembly 150 deswirls gas flow exiting the LPT 26. The low pressure turbine casing 54 may be bolted to the engine casing 45 between the HPT 24 and the LPT 26. A dome-shaped cover plate 156 is bolted to the annular box structure 154. The outlet guide vane assembly 150 is not referred to and does not function as a frame because it does not rotatably support any of the engine's rotors.

The high pressure compressor 18 of turbofan gas turbine engine 10 of the present invention is operable and designed to operate with a relatively high compressor pressure ratio in a range of about 15 to about 30 and an overall pressure ratio in a range of about 40 to about 65. The compressor pressure ratio is a measure in the rise of pressure across just the high pressure compressor 18. The overall pressure ratio is a measure in the rise of pressure across the fan all the way through the high pressure compressor 18, i.e., it is a ratio of pressure exiting the high pressure compressor divided by pressure of ambient air 14 entering the fan section 12. The high pressure compressor 18 is illustrated having six high pressure stages 48 and three variable vane stages 50 for the first four of the high pressure stages 48. Less than four variable vane stages 50 may be used. The high pressure compressor 18 has a relatively small number of the high pressure stages 48 and the invention contemplates using between 6 and 8 of the high pressure stages and about four of the variable vane stages 50 or less. This makes for a short engine while still having a high overall pressure ratio in a range of 40-65.

The engine has a design bypass ratio in a range of 5-15 and a design fan pressure ratio in a range of 1.4-2.5. The counter rotating first and second fan blade rows 13 and 15 are designed to operate with tip speeds that, for the two blade rows, sum to a range of about 1000 to 2500 feet/sec which allows the use of light weight composite fan blades. Light weight, uncooled, high temperature capability, counter rotating ceramic matrix composite (CMC) airfoils may be used in the low pressure turbine 26. Thus, the engine 10 and the fan section 12 may be described as having a sum of operational fan tip speeds of the first and second fan blade rows 13 and 15 in a range of 1000 to 2500 feet per second.

Referring still to FIG. 1, a tip radius RT is illustrated, as measured from the engine centerline 8 to a fan blade tip 188 of the first fan blade row 13 and a hub radius RH as measured from the engine centerline 8 to a rotor hub 196 of the low pressure inner rotor 200 at an entrance 186 to the inlet duct 19 to the high pressure compressor 18 of the core engine 25. The engine 10 of the present invention may be designed with a small fan inlet hub to tip radius ratio (RH/RT) in a range between 0.20 and 0.35. For a given set of fan inlet and inlet duct annulus areas a low fan inlet hub to tip radius ratio allows a smaller fan diameter when compared to a larger ratio. However, fan inlet hub to tip radius ratio levels are constrained by the ability to design a disk to support the rotating fan blades. The fan blades in the exemplary embodiment illustrated herein are made of lightweight composite materials or aluminum and rotor fan tip speeds are designed so that a fan disk 126 can be designed for the fan inlet hub to tip radius ratio to be as low as 0.20.

Figure 4:
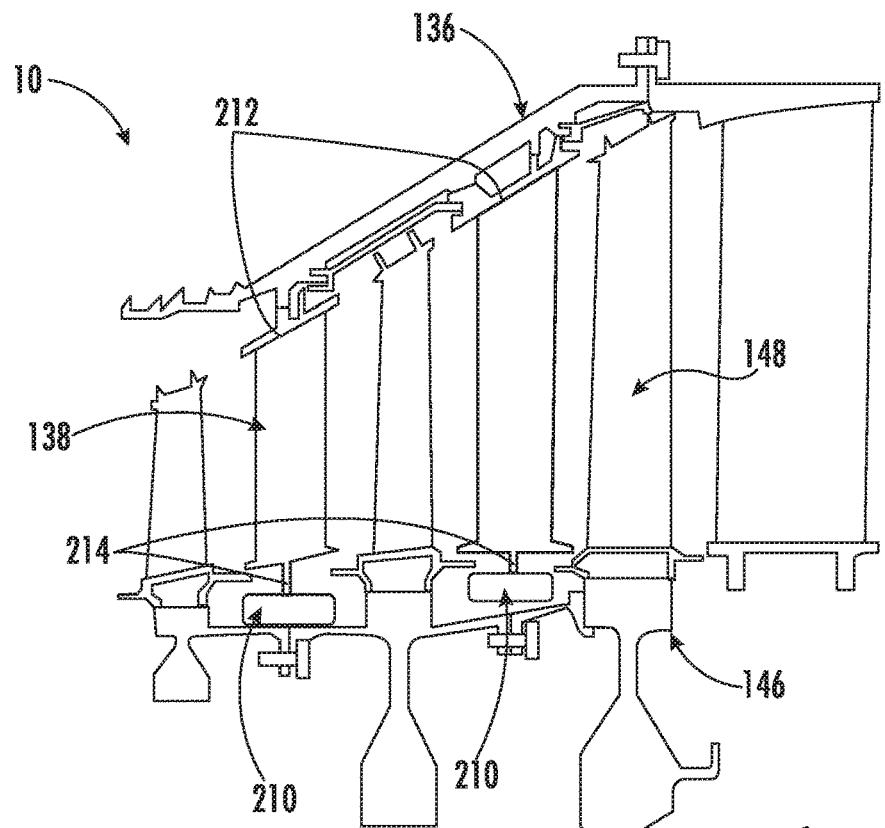
FIG. 4 illustrates a partial, side view of one embodiment of a section of the gas turbine engine according to the present disclosure, particularly illustrating a plurality of damper seals between a first plurality of turbine blades and a rotatable annular inner drum rotor.
Figure 5:
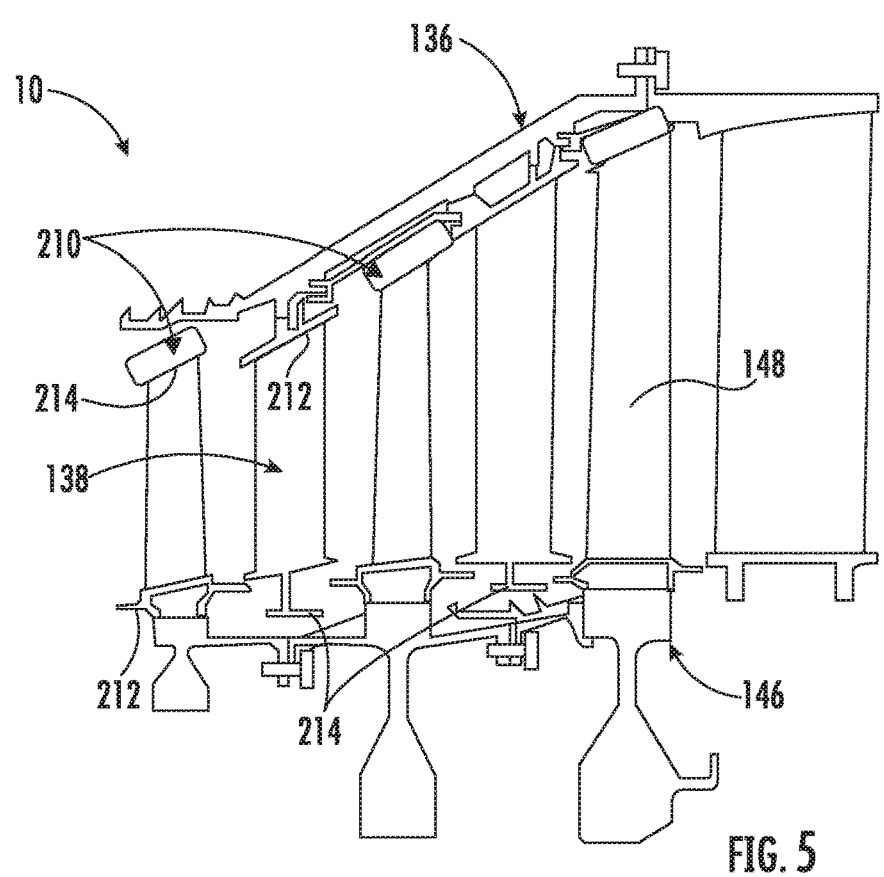
FIG. 5 illustrates a partial, side view of another embodiment of a section of the gas turbine engine according to the present disclosure, particularly illustrating a plurality of damper seals between a second plurality of turbine blades and a rotatable annular outer drum rotor.

Referring now to FIGS. 4 and 5, partial, side views of sections of the gas turbine engine 10 of the present disclosure are illustrated, particularly illustrating a plurality of annular, rotating damper seals 210. More specifically, as shown in FIG. 4, a plurality of damper seals 210 are positioned between the first plurality of turbine blades 138 and the rotatable annular inner drum rotor 146. Moreover, as shown, each of the first plurality of turbine blades 138 includes a blade root portion 212 and a blade tip portion 214. Thus, as shown, each of the damper seals 210 is positioned between one of the blade tip portions 214 of the first plurality of turbine blades 138 and the annular inner drum rotor 146. More specifically, as shown, the damper seal(s) 210 may directly contact the blade tip portions 214 of the gas turbine engine 10. Alternatively, as shown in FIG. 5, a plurality of damper seals 210 may also be positioned between one or more of the second plurality of turbine blades 148 and the rotatable annular outer drum rotor 136.

Figure 6:
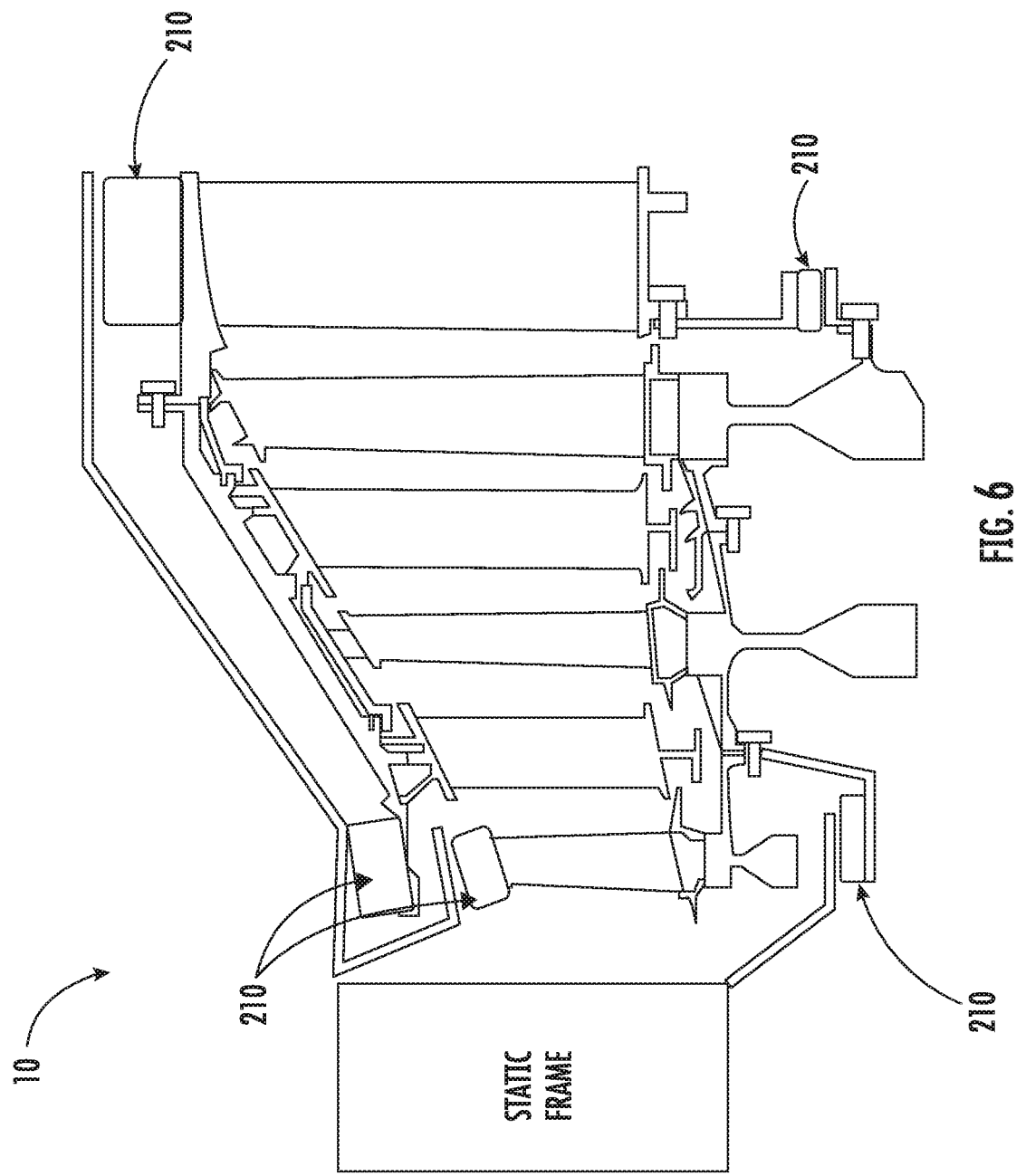
FIG. 6 illustrates a partial, side view of still another embodiment of a section of the gas turbine engine according to the present disclosure, particularly illustrating a plurality of damper seals between a rotor and a stator.

In still further embodiments, as shown in FIG. 6, the gas turbine engine 10 may have other suitable configurations that can benefit from the damper seal(s) 210 described herein. For example, as shown, the gas turbine engine 10 may have a conventional rotor-stator arrangement, with the damper seals 210 arranged at the rotor-stator interface. Moreover, as shown, the damper(s) 210 may also be arranged between an interface of two rotors of the gas turbine engine 10.

Figure 7:
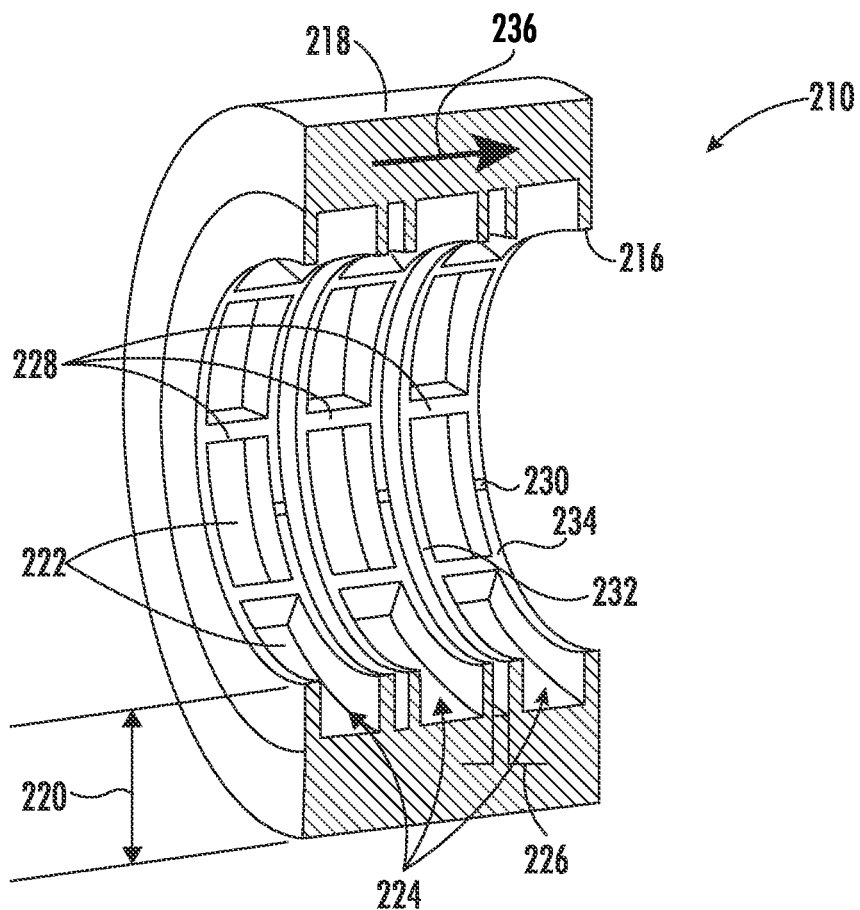
FIG. 7 illustrates a partial, cut-away perspective view of one embodiment of the damper seal according to the present disclosure.
Figure 8:
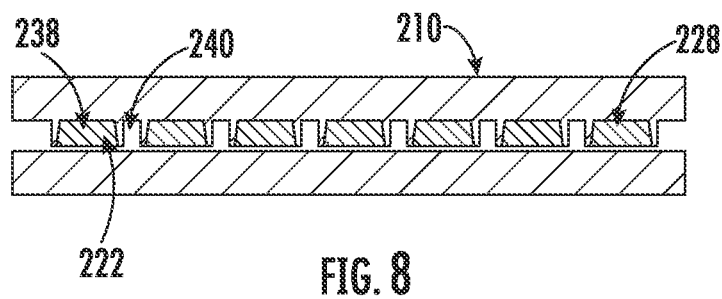
FIG. 8 illustrates a cross-sectional view of the damper seal of FIG. 7.
Figure 9:
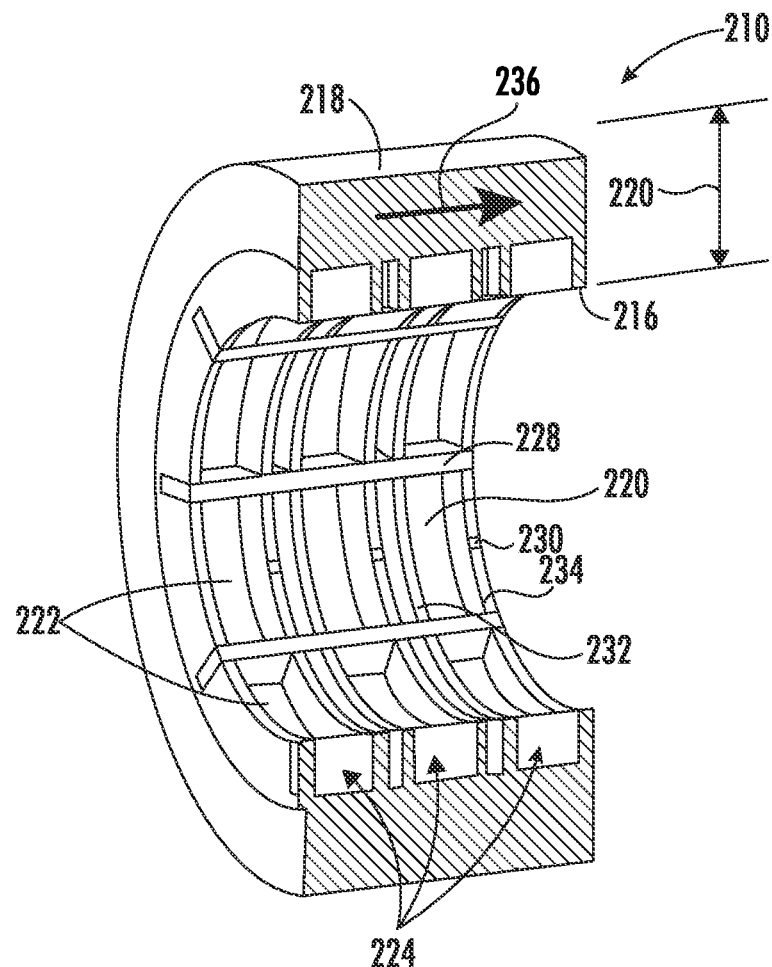
FIG. 9 illustrates a partial, cut-away perspective view of another embodiment of the damper seal according to the present disclosure.

Referring now to FIGS. 7-10, various views of multiple embodiments of the damper seal(s) 210 according to the present disclosure are illustrated. As shown in FIGS. 7 and 9, the damper seal(s) 210 may include an inner circumferential surface 216 and an outer circumferential surface 218 separated by a thickness 220. Thus, as shown in FIGS. 7-10, the inner circumferential surface 216 defines at least one cavity 222 configured to provide damping to the gas turbine engine 10. More specifically, as shown in FIGS. 7 and 9, in an embodiment, the inner circumferential surface 216 of the annular seal(s) 210 may define a plurality of cavities 222. Thus, in such embodiments, as shown, the plurality of cavities 222 may be arranged into a plurality of circumferential rows 224. In addition, as shown, the plurality of cavities 222 may be spaced equally apart circumferentially around the annular seal(s) 210 or may be spaced unevenly circumferentially around the annular seal(s) 210 i.e. depending on the location within the gas turbine engine 10 (e.g. turbine, compressor, booster, etc.).

In another embodiment, as shown, the inner circumferential surface 216 of the annular seal(s) 210 may include at least one plenum 226 arranged between two of the plurality of circumferential rows 224.

Moreover, as shown, the inner circumferential surface 216 of the annular seal(s) 210 may further define at least one partition 228 positioned between at least two of the plurality of cavities 222. For example, in one embodiment, as shown in FIG. 7, the damper seal 210 may include a plurality of partitions 228. In such embodiments, each of the plurality of partitions 228 may have a length less than or equal to one of the plurality of circumferential rows 224 so as to not intersect the plenum(s) 226. Thus, as shown in FIG. 7, the illustrated seal 210 may be generally referred to as a pocket damper seal, where the partitions 228 do not extend from one circumferential row 224 to another. Accordingly, as shown in FIG. 8, there are both active 238 and inactive 240 cavities 222 present within this seal 210. Active cavities 238 are the cavities 222 with partitions 228, whereas inactive cavities 240 are the cavities 222 with continuous circumferential flow in the absence of the partitions 228. For the pocket damper seal concept, the partitions 228 in one cavity can be at a different tangential location than the other cavity.

Figure 10:
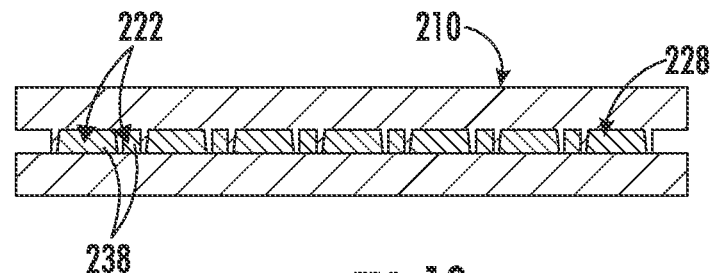
FIG. 10 illustrates a cross-sectional view of the damper seal of FIG. 9.

In alternative embodiments, as shown in FIGS. 9 and 10, the partition(s) 228 may extend across at least two of the plurality of circumferential rows 224 so as to intersect the plenum(s) 226. Thus, as shown in FIGS. 9 and 10, the illustrated seal 210 may be generally referred to as a fully-partitioned seal, where the partitions 228 extend right from forward till the aft of the damper seal. For the fully-partitioned concept, the partitions 228 may or may not be a continuous structure from the forward to the aft of the seal 210, i.e. the partitions 228 in one cavity can be at a different tangential location than the other cavity. In such embodiments, as shown in FIG. 10, all of the cavities 222 are active cavities 238.

Still referring to FIGS. 7 and 9, in another embodiment, one or more of the plurality of cavities 222 may include at least one notch 230. For example, in one embodiment, each of the plurality of cavities 222 may have a first side 232 and second side 234 with respect to an airflow direction 236 of the annular seal(s) 210. Accordingly, in such embodiments, the notch(es) 230 may be formed into one or more of the second sides 234 of the plurality of cavities 222.

Further aspects of the invention are provided by the subject matter of the following clauses:

Clause 1. A turbomachine, comprising:
a rotatable annular drum rotor;
a first plurality of blades connected to the rotatable annular drum rotor, each of the first plurality of blades comprising a blade root portion and a blade tip portion, the blade root portions secured to the rotatable annular drum rotor; and
an annular seal positioned between at least one of the blade tip portions and the rotatable annular drum rotor, the annular seal comprising an inner circumferential surface and an outer circumferential surface separated by a thickness, the inner circumferential surface defining at least one cavity configured to provide damping to the turbomachine.

Clause 2. The turbomachine of clause 1, wherein the inner circumferential surface of the at least one annular seal defines a plurality of cavities.

Clause 3. The turbomachine of clauses 1-2, wherein the plurality of cavities are arranged into a plurality of circumferential rows.

Clause 4. The turbomachine of any of the preceding clauses, wherein the inner circumferential surface of the at least one annular seal further comprises at least one plenum arranged between two of the plurality of circumferential rows.

Clause 5. The turbomachine of any of the preceding clauses, wherein the inner circumferential surface of the at least one annular seal further comprises at least one partition positioned between at least two of the plurality of cavities.

Clause 6. The turbomachine of any of the preceding clauses, wherein the at least one partition comprises a plurality of partitions, each of the plurality of partitions having a length less than or equal to one of the plurality of circumferential rows so as to not intersect the at least one plenum.

Clause 7. The turbomachine of any of the preceding clauses, wherein the at least one partition extends across at least two of the plurality of circumferential rows so as to intersect the at least one plenum.

Clause 8. The turbomachine of any of the preceding clauses, wherein one or more of the plurality of cavities comprises at least one notch.

Clause 9. The turbomachine of any of the preceding clauses, wherein each of the plurality of cavities comprises a first side and second side with respect to an airflow direction of the at least one annular seal, the at least one notch formed into one or more of the second sides of the plurality of cavities.

Clause 10. The turbomachine of any of the preceding clauses, wherein the at least one annular seal contacts at least one of the blade tip portions.

Clause 11. The turbomachine of any of the preceding clauses, wherein the turbomachine comprises at least one of a turbine section, a compressor section, or a booster section.

Clause 12. The turbomachine of any of the preceding clauses, wherein the rotatable annular drum rotor comprises a rotatable annular outer drum rotor, the turbomachine further comprising a rotatable annular inner drum rotor and a second plurality of blades connected to the rotatable annular inner drum rotor, the first plurality of blades being interdigitated with the second plurality of blades.

Clause 13. The turbomachine of any of the preceding clauses, further comprising a stator and a second plurality of blades connected to the stator, the first plurality of blades being interdigitated with the second plurality of blades.

Clause 14. A damper seal for a turbomachine, comprising: an annular body comprising an inner circumferential surface and an outer circumferential surface separated by a thickness, the inner circumferential surface defining a plurality of cavities arranged into a plurality of circumferential rows and at least one partition positioned between at least two of the plurality of cavities, the inner circumferential surface further defining at least one plenum arranged between two of the plurality of circumferential rows.

Clause 15. The damper seal of clause 14, wherein the at least one partition comprises a plurality of partitions, each of the plurality of partitions having a length less than or equal to one of the plurality of circumferential rows so as to not intersect the at least one plenum.

Clause 16. The damper seal of clauses 14-15, wherein the at least one partition extends across at least two of the plurality of circumferential rows so as to intersect the at least one plenum.

Clause 17. The damper seal of clauses 14-16, wherein the plurality of cavities are spaced equally apart circumferentially around the at least one annular seal.

Clause 18. The damper seal of clauses 14-17, wherein one or more of the plurality of cavities comprises at least one notch.

Clause 19. The damper seal of clauses 14-18, wherein each of the plurality of cavities comprises a first side and second side with respect to an airflow direction of the at least one annular seal, the at least one notch formed into one or more of the second sides of the plurality of cavities.

Clause 20. The damper seal of clauses 14-19, wherein the damper seal is sized to fit between a blade tip portion of a blade connected to a rotor or a stator of the turbomachine and an opposite of the rotor or stator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine, comprising:
a rotatable annular drum rotor;
a first plurality of blades connected to the rotatable annular drum rotor, each of the first plurality of blades comprising a blade root portion and a blade tip portion, the blade root portions secured to the rotatable annular drum rotor; and
an annular seal positioned between at least one of the blade tip portions and the rotatable annular drum rotor, the annular seal comprising an inner circumferential surface and an outer circumferential surface separated by a thickness, the inner circumferential surface defining a plurality of cavities configured to provide damping to the turbomachine, the plurality of cavities being arranged into a plurality of circumferential rows,
wherein the inner circumferential surface of the at least one annular seal comprises at least one plenum arranged between two of the plurality of circumferential rows, the at least one plenum defining an air passageway.

2. The turbomachine of claim 1, wherein the inner circumferential surface of the at least one annular seal further comprises at least one partition positioned between at least two of the plurality of cavities.

3. The turbomachine of claim 2, wherein the at least one partition comprises a plurality of partitions, each of the plurality of partitions having a length less than or equal to one of the plurality of circumferential rows so as to not intersect the at least one plenum.

4. The turbomachine of claim 3, wherein the at least one partition extends across at least two of the plurality of circumferential rows so as to intersect the at least one plenum.

5. The turbomachine of claim 1, wherein one or more of the plurality of cavities comprises at least one notch.

6. The turbomachine of claim 5, wherein each of the plurality of cavities comprises a first side and second side with respect to an airflow direction of the at least one annular seal, the at least one notch formed into one or more of the second sides of the plurality of cavities.

7. The turbomachine of claim 1, wherein the at least one annular seal contacts at least one of the blade tip portions.

8. The turbomachine of claim 1, wherein the turbomachine comprises at least one of a turbine section, a compressor section, or a booster section.

9. The turbomachine of claim 1, wherein the rotatable annular drum rotor comprises a rotatable annular outer drum rotor, the turbomachine further comprising a rotatable annular inner drum rotor and a second plurality of blades connected to the rotatable annular inner drum rotor, the first plurality of blades being interdigitated with the second plurality of blades.

10. The turbomachine of claim 1, further comprising a stator and a second plurality of blades connected to the stator, the first plurality of blades being interdigitated with the second plurality of blades.

11. A damper seal for a turbomachine, comprising:
an annular body comprising an inner circumferential surface and an outer circumferential surface separated by a thickness, the inner circumferential surface defining a plurality of cavities arranged into a plurality of circumferential rows and at least one partition positioned between at least two of the plurality of cavities, the inner circumferential surface further defining at least one plenum arranged between two of the plurality of circumferential rows, the at least one plenum defining an air passageway.

12. The damper seal of claim 11, wherein the at least one partition comprises a plurality of partitions, each of the plurality of partitions having a length less than or equal to one of the plurality of circumferential rows so as to not intersect the at least one plenum.

13. The damper seal of claim 11, wherein the at least one partition extends across at least two of the plurality of circumferential rows so as to intersect the at least one plenum.

14. The damper seal of claim 11, wherein the plurality of cavities are spaced equally apart circumferentially around the at least one annular seal.

15. The damper seal of claim 11, wherein one or more of the plurality of cavities comprises at least one notch.

16. The damper seal of claim 15, wherein each of the plurality of cavities comprises a first side and second side with respect to an airflow direction of the at least one annular seal, the at least one notch formed into one or more of the second sides of the plurality of cavities.

17. The damper seal of claim 11, wherein the damper seal is sized to fit between a blade tip portion of a blade connected to a rotor or a stator of the turbomachine and an opposite of the rotor or stator.

* * * * *